(12) United States Patent
Delègue et al.

(10) Patent No.: US 9,094,518 B2
(45) Date of Patent: Jul. 28, 2015

(54) LOCATION BASED SYSTEM AND METHOD FOR EXCHANGING VIDEOS OR NOTES

(75) Inventors: Gerard Delègue, Cachan (FR); Emmanuel Marilly, Saint Michel sur Orge (FR)

(73) Assignee: Alcatel Lucent, Boulogne-Billancourt (FR)

( * ) Notice: Subject to any disclaimer, the term of this patent is extended or adjusted under 35 U.S.C. 154(b) by 2554 days.

(21) Appl. No.: 11/747,894

(22) Filed: May 12, 2007

(65) Prior Publication Data
US 2008/0280598 A1  Nov. 13, 2008

(51) Int. Cl.
*H04M 3/42*   (2006.01)
*H04M 3/533*  (2006.01)
*H04W 4/02*   (2009.01)
*H04L 29/08*  (2006.01)

(52) U.S. Cl.
CPC .............. *H04M 3/533* (2013.01); *H04L 67/18* (2013.01); *H04W 4/02* (2013.01); *H04M 2203/4509* (2013.01); *H04M 2242/15* (2013.01)

(58) Field of Classification Search
CPC ..................... H04M 3/533; H04M 2203/4509; H04M 2242/15; H04W 4/02; H04L 67/18
USPC ............... 455/414.1, 41.2, 456.1–456.6, 466; 370/310, 313; 725/80, 81, 109, 112, 725/110, 131
See application file for complete search history.

(56) References Cited

U.S. PATENT DOCUMENTS

| 2005/0047426 | A1* | 3/2005 | Aaltonen et al. ............... 370/432 |
| 2005/0221876 | A1* | 10/2005 | Van Bosch et al. ......... 455/575.9 |
| 2006/0040610 | A1* | 2/2006 | Kangas .......................... 455/3.06 |
| 2006/0184989 | A1* | 8/2006 | Slothouber .................... 725/110 |
| 2008/0045215 | A1* | 2/2008 | Chen et al. ................. 455/435.2 |
| 2008/0049616 | A1* | 2/2008 | Kamath et al. ................ 370/235 |
| 2008/0075099 | A1* | 3/2008 | Alao et al. ..................... 370/401 |
| 2008/0141325 | A1* | 6/2008 | Ludvig et al. ................. 725/116 |
| 2008/0155615 | A1* | 6/2008 | Craner et al. ................... 725/91 |
| 2008/0216145 | A1* | 9/2008 | Barton et al. ................. 725/131 |
| 2008/0233956 | A1* | 9/2008 | Wyk et al. ................... 455/435.1 |
| 2009/0080457 | A1* | 3/2009 | Liang et al. .................... 370/462 |
| 2009/0165039 | A1* | 6/2009 | Soo et al. ......................... 725/34 |
| 2009/0165065 | A1* | 6/2009 | McClenny et al. ............ 725/108 |
| 2009/0199259 | A1* | 8/2009 | Alao et al. ....................... 725/147 |
| 2010/0058421 | A1* | 3/2010 | Hastings et al. ............. 725/116 |
| 2011/0070879 | A1* | 3/2011 | Walter et al. .................. 455/420 |
| 2013/0014160 | A1* | 1/2013 | Harris ............................. 725/34 |

* cited by examiner

*Primary Examiner* — Khawar Iqbal
(74) *Attorney, Agent, or Firm* — Capitol Patent & Trademark Law Firm, PLLC

(57) ABSTRACT

A system and method are described herein for enabling end-users of mobile terminals to exchange messages that are associated with a specific geographical location. In one embodiment, a first end-user can use their mobile terminal to submit a message (text, voice, video . . . ) about a specific piece of art located in a museum. Then, a second end-user can use their mobile terminal to retrieve the message (which was previously provided by the first end-user) that is associated with the specific piece of art while they are located in the museum.

15 Claims, 3 Drawing Sheets

US 9,094,518 B2

LOCATION BASED SYSTEM AND METHOD FOR EXCHANGING VIDEOS OR NOTES

TECHNICAL FIELD

The present invention relates to a system and method for enabling end-users of mobile terminals to exchange messages that are associated with a specific geographical location.

BACKGROUND

People standing in a specific location (in a museum, in a shop or in a tourist place, . . . ) may want to use their mobile terminal to make comments or give information to other people (with mobile terminals) who will in the future be standing in or near that specific location. The comments can be a short text message, voice message or a video/photo that is somehow related to that specific location. For example, a person may want to give their opinion about a certain restaurant in a shopping center. In contrast, some people may want to use their mobile terminal to receive information about the specific location at which they are currently located without having to surf the web to find information that is associated with that specific location. In the same example, another person may want to hear what other people think about the certain restaurant in that particular shopping center.

There a various solutions available today that people with mobile terminals can use to exchange notes or videos about a specific geographical location such as (for example):

1) Web Sites, Blog: Solutions based on the Interent enables people to post comments or videos that are related to a specific location. However, the location information is not automatically taken into account when another person is located near that specific location and wants to retrieve messages (personal content) about that specific location. In particular, the search engine does not have a native feature to retrieve messages (personal content) that are linked to a precise geographic position.

2) TV broadcasting, message broadcasting: Solutions based on TV broadcasting enables the broadcast of notifications, TV shows or messages to selected mobile terminals. However, these solutions do not propose a feature to broadcast messages (personal content) which are related to a specific geographic location to mobile terminals which are located near that specific geographic location.

3) Participation TV: Participation TV is a relatively new activity that allows people to turn their mobile terminals into an active social experience. For instance, people can use their mobile terminals so they can act as contestants in quizzes or can take the role of quizmaster which is more interactive than just sending an answer to a question by using a short message service (SMS). However, this solution does not consider the specific geographic location of the participant when forwarding or receiving messages (personal content) from or to that participant.

As can be seen, there is a need to have a solution (or service) that enables end-users of mobile terminals to exchange messages that are associated with a specific geographical location. In particular, there is a need that enables a first end-user to use their mobile terminal to create and submit a message related to a specific geographical location where the submitted message is stored in a service platform. And, there is a need that enables a second end-user to use their mobile terminal to retrieve the stored message and possibly other stored messages associated with the specific geographical location whenever the second mobile terminal is located near that specific geographical location. These needs and other needs are satisfied by the present invention.

SUMMARY

The present invention provides a method for enabling end-users of mobile terminals to exchange messages that are associated with a specific geographical location. The method includes the steps of: (a) enabling a first end-user of a first mobile terminal to submit a message (e.g., text, voice, video) associated with the specific geographical location where the submitted message is stored in a service platform; and (b) enabling a second end-user of a second mobile terminal to retrieve the stored message and possibly other stored messages associated with the specific geographical location when the second mobile terminal is located near that specific geographical location. Three exemplary systems which can implement this method are also discussed in detail herein in accordance with the present invention.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
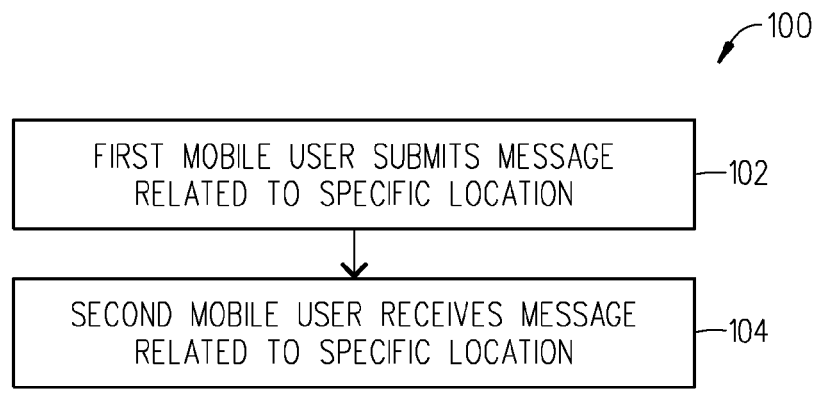
FIG. 1 is a flowchart that illustrates the basic steps of a method for enabling end-users of mobile terminals to exchange messages about a specific geographical location in accordance with the present invention.

Referring to FIG. 1, there is a flowchart illustrating the basic steps of a method 100 for enabling end-users of mobile terminals to exchange messages about a specific geographical location in accordance with the present invention. Beginning at step 102, a first end-user can use their mobile terminal to submit a message associated with the specific geographical location where the submitted message is stored within a service platform (e.g., Open Services Platform (OSP), My Service Platform (MySF), Service Enabling Platform, IP Multimedia Subsystem (IMS) platform). In one example, the first end-user can use their mobile terminal to submit a message (text, voice, video . . . ) associated with a specific piece of art that is located in a museum. At step 104, a second end-user can use their mobile terminal to retrieve the stored message and possibly other stored messages which are associated with the specific geographical location when the second mobile terminal is located near the specific geographical location. In the same example, the second end-user can use their mobile terminal to receive the message (which was previously submitted by the first end-user) that was associated with the specific piece of art while they are located in the museum. Detailed discussions about three different systems 200, 300 and 400 which can implement this particular method 100 are provided below with respect to FIGS. 2-4.

Figure 2:
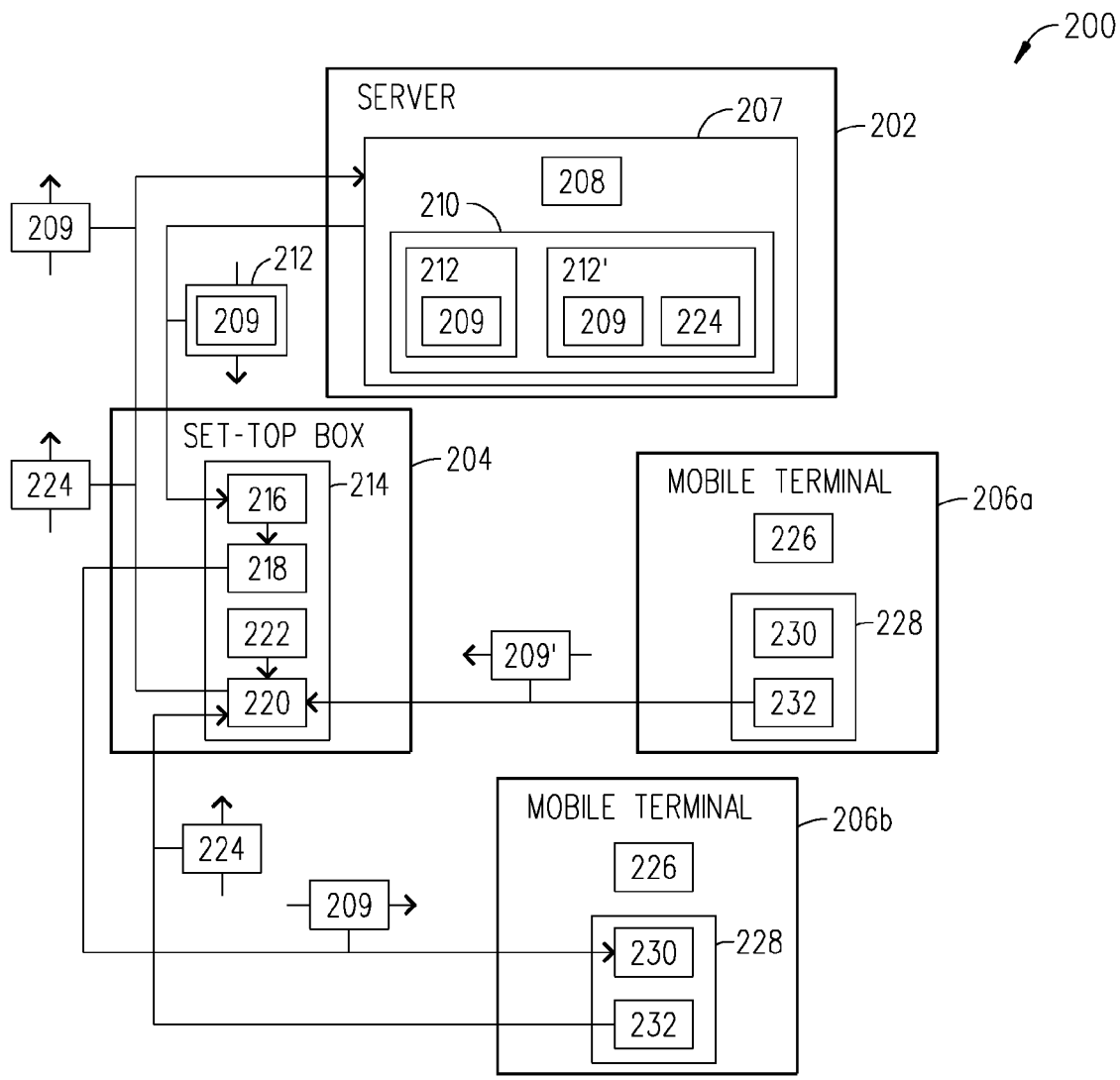
FIG. 2 is a block diagram that illustrates the basic components of a system which enables a first end-user (using a mobile terminal) and a second end-user (using a mobile terminal) to use the method shown in FIG. 1 in accordance with a first embodiment of the present invention.

Referring to FIG. 2, there is a block diagram illustrating a system 200 which enables the first end-user (using mobile terminal 206*a*) and the second end-user (using mobile terminal 206*b*) to use the method 100 shown in FIG. 1 in accordance with a first embodiment of the present invention. The system 200 includes a service platform 202, one or more set-top boxes 204 (only one shown), and one or more mobile terminals 206 (only two mobile terminals 206*a* and 206*b* shown). The service platform 202 has a multimedia data sharing enabler unit 207 which includes a multimedia data storage manager 208 (software module) that functions to receive messages 209 (text, voice, video . . . ) from the set-top box 204 (plus other set-top boxes 204) and store them within a centralized database 210 (note: assume mobile terminal 206*a* creates one of the messages 209' which is subsequently sent via the set-top box 204 to the service platform 202). In particular, the multimedia data storage manager 208 builds and stores multiple carousels 212 each of which includes messages 209 that are received from a corresponding set-top box 204 such that each set-top box 204 has their own respective carousel 212 (note: the carousel 212 can also store messages that are received from sources other than the set-top box 204 such as for example from an advertiser, business etc. . . . ). If desired, the multimedia data storage manager 208 can control the life cycles of the stored messages 209. For instance, the multimedia data storage manager 208 can delete a stored message 209 if no end-user consults the message 209, if the message 209 has been stored for a predetermined time, or if an administrator wants to delete the message 209.

The set-top box 204 includes a local agent 214 which has the following components/functionalities: (a) a multimedia data downloader unit 216; (b) a carousel broadcast unit 218; (c) a multimedia data uploader unit 220; and (d) a location unit 222. The multimedia data downloader unit 216 (software module) functions to download their respective carousel 212 (and new versions of their respective carousel 212') from the service platform 202. The carousel broadcast unit 218 functions to broadcast the messages 209 (e.g., text, voice, video) which are stored within the received carousel 212. In one embodiment, the carousel broadcast unit 218 broadcasts (via WiFi, Bluetooth etc. . . . ) the first message, the second message . . . the last message and then continually re-broadcasts all of the messages such that after the last message has been transmitted then the first message is transmitted again to the mobile terminal 206*b* (for example) (note: other mobile terminals 206 can receive these messages 209 if this service is activated and if they are located near the set-top box 204). The multimedia data uploader unit 220 (software module) functions to collect a new message 224 submitted by the end-user of the mobile terminal 206*b* (for example). In addition, the multimedia data uploader unit 220 functions to add an end-user identifier and a location identifier to the collected new message 224 before uploading the collected new message 224 to the service platform 202 (note: an updated carousel 212' is shown containing the previous messages 209 and the new message 224). The location unit 222 (e.g., global positioning satellite (GPS) unit 222) functions to determine the geographic location of the set-top box 204 which enables the multimedia data uploader unit 220 to add the proper location identifier to the collected message 224.

The mobile terminals 206*a* and 206*b* each have a display 226 and a mobile terminal agent 228 that includes the following components/functionalities: (a) a multimedia data listener unit 230; and (b) a multimedia data editor unit 232. The multimedia data listener unit 230 functions to detect the presence of any one of the set-top boxes 204, receive the broadcasted messages 209 within the carousel 212 from the detected set-top box 204, and enable the received messages 209 to be presented via the display 226 to the end-user of the mobile terminal 206*b* (for example). In addition, the multimedia data listener unit 230 can filter the received messages 209 to determine which if any of the received messages 209 should not be presented via the display 226 to the end-user of the mobile terminal 206*b* (for example). For instance, the multimedia data listener unit 230 can filter (i.e., block) any one of the received messages 209 according to various criteria including (for example): (a) the date of message 209; (b) the size of message 209; and (c) if the message 209 is received from certain set-top box(es) 204. The multimedia data editor unit 232 functions to collect the new message 224 from the end-user and then send the collected new message 224 to the set-top box 204 (see mobile terminal 206*b*).

Figure 3:
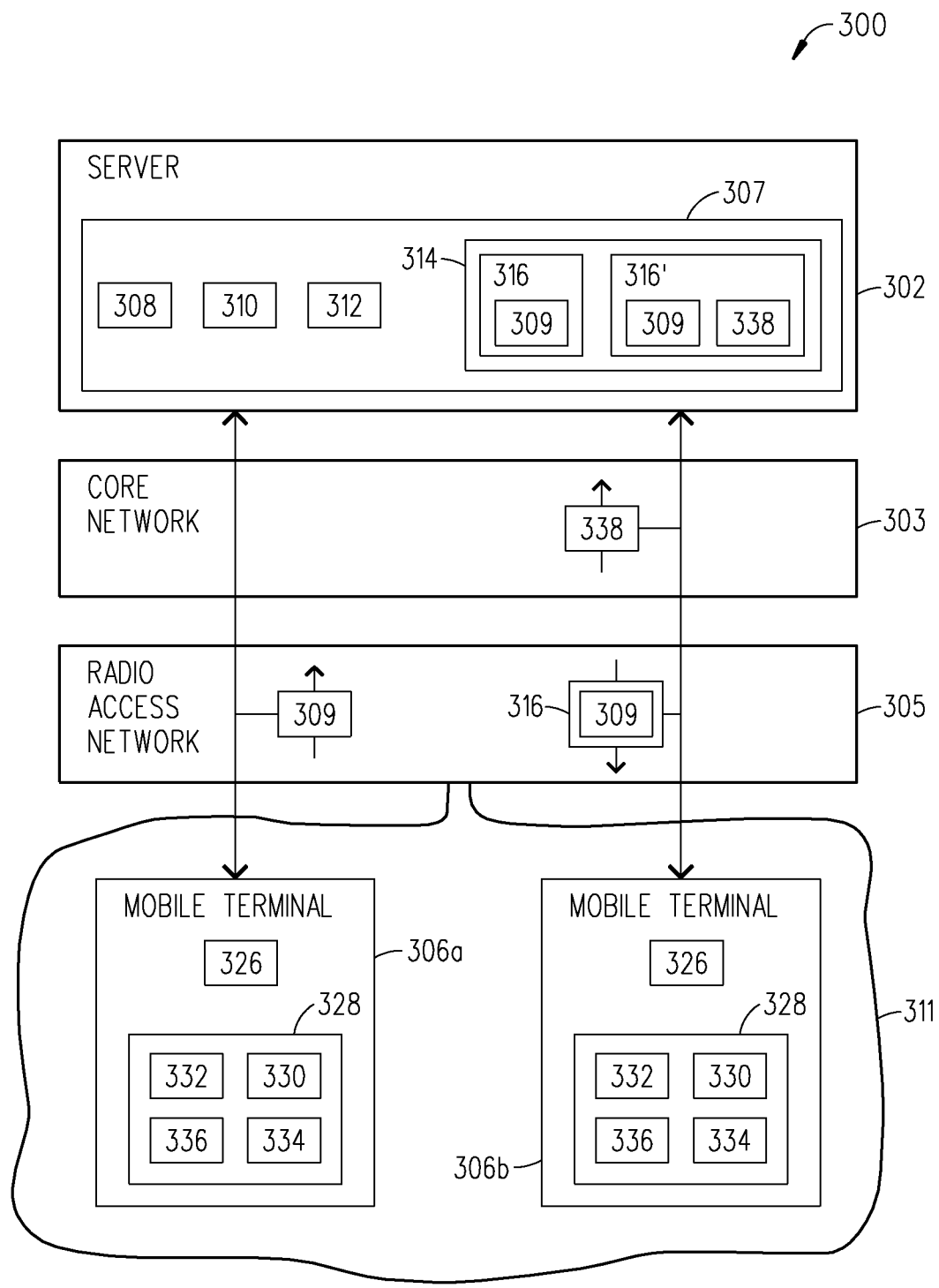
FIG. 3 is a block diagram that illustrates the basic components of a system which enables a first end-user (using a mobile terminal) and a second end-user (using a mobile terminal) to use the method shown in FIG. 1 in accordance with a second embodiment of the present invention.

Referring to FIG. 3, there is a block diagram illustrating a system 300 which enables the first end-user (using mobile terminal 306*a*) and the second end-user (using mobile terminal 306*b*) to use the method 100 shown in FIG. 1 in accordance with a second embodiment of the present invention. The system 300 includes a service platform 302 which interacts via a core network 303 and a radio access network 305 with one or more mobile terminals 306 (only two mobile terminals 306*a* and 306*b* shown). The service platform 302 has a multimedia data sharing enabler unit 307 which includes the following components/functionalities: (a) a multimedia data storage manager 308; (b) a location unit 310; and (c) a carousel server 312. A detailed discussed is provided next about the function of each of these units 308, 310 and 312.

The multimedia data storage manager 308 (software module) functions to receive messages 309 (from mobile terminals 306, businesses, advertisers etc. . . . ) and store the received messages 309 (e.g., text, voice, video) within a centralized database 314 (note: mobile terminal 306*a* creates one of the messages 309 which is sent to and stored within the service platform 302). In particular, the multimedia data storage manager 308 builds and stores one or more carousels 316 each of which includes messages 309 that are associated with a corresponding specific geographical location (note: in this embodiment each specific geographical location is a cell within the radio access network 305). If desired, the multimedia data storage manager 308 can control the life cycles of the stored messages 309. For instance, the multimedia data storage manager 308 can delete a stored message 309 if no end-user consults the message 309, if the message 309 has been stored for a predetermined time, or if an administrator wants to delete the message 309.

The location unit 310 functions to determine the specific geographical location of each of the mobile terminals 306*a* and 306*b*. In this embodiment, the location unit 310 uses cell identification numbers located within signals that are transmitted from the mobile terminals 306*a* and 306*b* to determine their specific geographical location which corresponds to a particular cell within the radio access network 305 (note: assume mobile terminals 306*a* and 306*b* are or where at one time located in cell 311 of the radio access network 305). In this way, the multimedia data storage manager 308 is able to determine which carousel 316 (associated with a specific cell 311) should store the message 309 which had been submitted by the end-user of the mobile terminal 306*a*.

The carousel server 312 functions to broadcast the messages from the different carousels 316 within their corresponding cells (specific geographical locations) of the radio access network 305. In this way, the mobile terminal 306*b* (for example) which is currently located within cell 311 can receive the messages 309 from the carousel 316 that is associated with the same cell 311 in the radio access network 305. In one embodiment, the carousel server 312 broadcasts the messages 309 (e.g., text, voice, video) from each carousel 316 such that the first message, the second message . . . the last message are continually broadcasted where after the last message has been transmitted then the first message is transmitted again to the mobile terminal 306*b* (note: other mobile terminals 306 can receive these messages 309 if this service is activated and if they are located in the same cell 311 of the radio access network 305).

The mobile terminals 306*a* and 306*b* each have a display 326 and a mobile terminal agent 328 that includes the following components/functionalities: (a) a multimedia data listener unit 330; (b) a multimedia data downloader unit 332; (c) a multimedia data editor unit 334; and (d) a multimedia data uploader unit 336. The multimedia data listener unit 330 functions to detect the service platform 302. The multimedia data downloader unit 332 functions to receive the broadcasted messages 309 and enables the received messages 309 to be presented via the display 326 to the end-user of the mobile terminal 306*b* (for example). In addition, the multimedia data listener unit 332 can filter the received messages 309 to determine which if any of the received messages 309 should not be presented via the display 326 to the end-user of mobile terminal 306*b* (for example). For instance, the multimedia data listener unit 330 can filter (i.e., block) any one of the received messages 309 according to various criteria including (for example): (a) the date of message 309 and (b) the size of message 309. The multimedia data editor unit 334 functions to collect a new message 338 from the end-user of the mobile terminal 306*b* (for example). And, the multimedia data uploader unit 336 functions to add an end-user identifier to the collected new message 338 and upload the collected new message 338 to the service platform 302 (note: an updated carousel 316' is shown containing the previous messages 309 and the new message 338).

Figure 4:
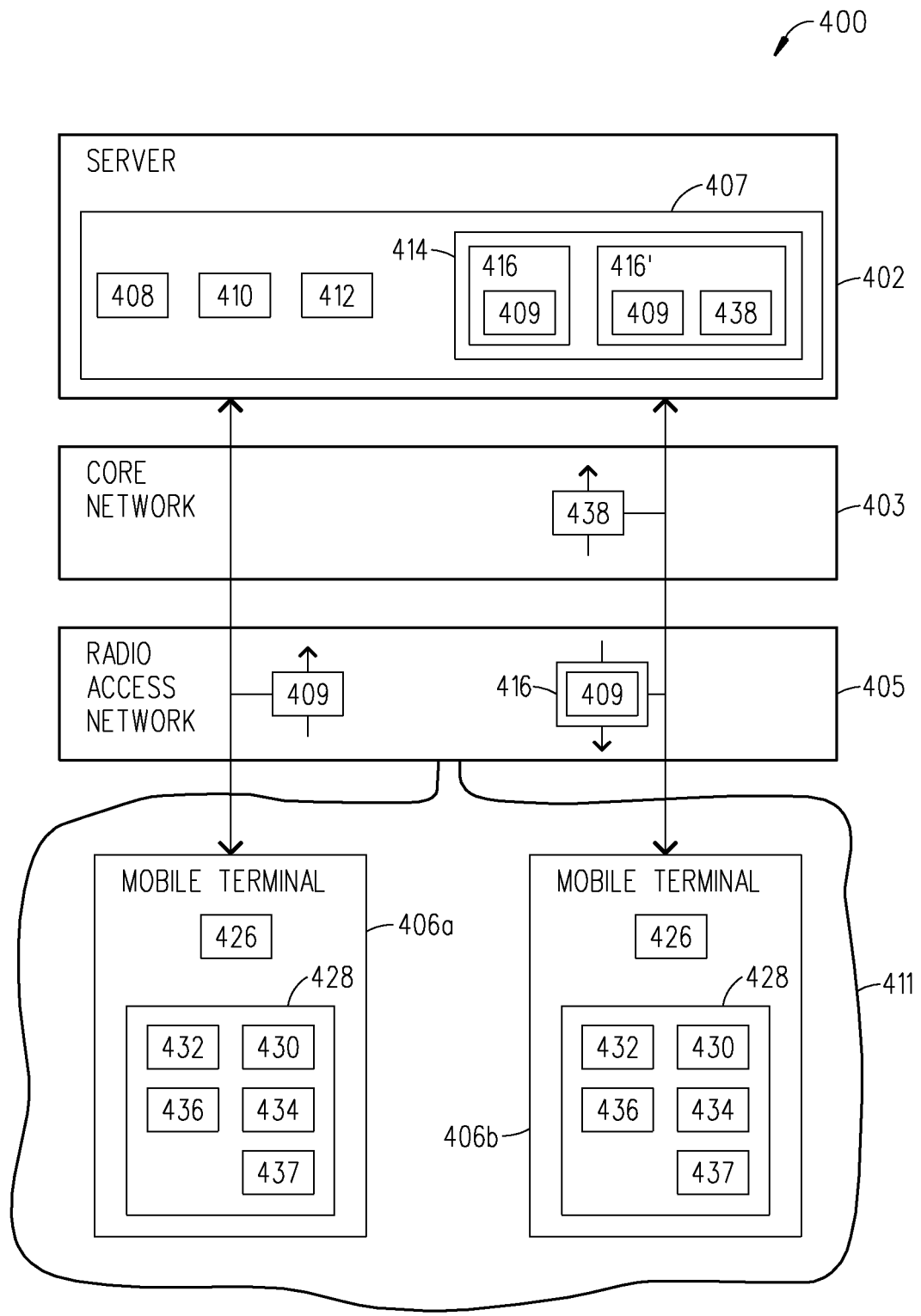
FIG. 4 is a block diagram that illustrates the basic components of a system which enables a first end-user (using a mobile terminal) and a second end-user (using a mobile terminal) to use the method shown in FIG. 1 in accordance with a third embodiment of the present invention.

Referring to FIG. 4, there is a block diagram illustrating a system 400 which enables the first end-user (using mobile terminal 406*a*) and the second end-user (using mobile terminal 406*b*) to use the method 100 shown in FIG. 1 in accordance with a third embodiment of the present invention. The system 400 includes a service platform 402 which interacts via a core network 403 and a radio access network 405 with one or more mobile terminals 406 (only two mobile terminals 406*a* and 406*b* shown). The service platform 402 has a multimedia data sharing enabler unit 407 which includes the following components/functionalities: (a) a multimedia data storage manager 408; (b) a location unit 410; and (c) a carousel server 412. A detailed discussion is provided next about the function of these units 408, 410 and 412.

The multimedia data storage manager 408 (software module) functions to receive messages 409 (from mobile terminals 406, businesses, advertisers etc. . . . ) and store the received messages 409 (e.g., text, voice, video) within a centralized database 414 (note: mobile terminal 406*a* creates one of the messages 409 which is sent to and stored within the service platform 402). In particular, the multimedia data storage manager 408 builds and stores one or more carousels 416 each of which includes messages 409 that are associated with a corresponding specific geographical location (note: in this embodiment each specific geographical location is an area defined by global positioning satellite (GPS) coordinates). If desired, the multimedia data storage manager 408 can control the life cycles of the stored messages 409. For instance, the multimedia data storage manager 408 can delete a stored message 409 if no end-user consults the message 409, if the message 409 has been stored for a predetermined time, or if an administrator wants to delete the message 409.

The location unit 410 functions to determine the specific geographical location 411 of each of the mobile terminals 406*a* and 406*b*. In this embodiment, the location unit 410 uses an Assisted-Global Positioning System (A-GPS) to analyze signals (which contain GPS information) transmitted from the mobile terminals 406*a* and 406*b* to determine their specific geographical location 411 within the radio access network 405 (note: assume mobile terminals 406*a* and 406*b* are or where at one point located in the same geographical area 411 of the radio access network 405). In this way, the multimedia data storage manager 408 is able to determine which carousel 416 (associated with a specific geographical location 411) should store the message 409 which had been submitted by the end-user of the mobile terminal 406*a*.

The carousel server 412 functions to broadcast the messages from the different carousels 416 within their corresponding pre-defined geographical areas of the radio access network 405 (note: the size of these pre-defined geographical areas could be configured by the administrator of the service platform 402 or established by the end-users of the mobile terminals 406). In this way, the mobile terminal 406*b* (for example) which is currently located within the pre-defined geographical location 411 can receive the messages 409 from the carousel 416 that is associated with the same geographical location 411 within the radio access network 405. In one embodiment, the carousel server 412 broadcasts the messages 409 (e.g., text, voice, video) from each carousel 416 such that the first message, the second message . . . the last message are continually broadcasted where after the last message has been transmitted then the first message is transmitted again to the mobile terminal 406*b* (note: other mobile terminals 406 can receive these messages 409 if this service is activated and if they are located in the same geographical area 411 of the radio access network 405).

The mobile terminals 406*a* and 406*b* each have a display 426 and a mobile terminal agent 428 that includes the following components/functionalities: (a) a multimedia data listener unit 430; (b) a multimedia data downloader unit 432; (c) a multimedia data editor unit 434; (d) a multimedia data uploader unit 436; and (e) a location function unit 437 (e.g., GPS unit 437). The multimedia data listener unit 430 functions to detect the service platform 402. The multimedia data downloader unit 432 functions to receive the broadcasted messages 409 and enables the received messages 409 to be presented via the display 426 to the end-user of the mobile terminal 406*b* (for example). In addition, the multimedia data listener unit 432 can filter the received messages 409 to determine which if any of the received messages 409 should not be presented via the display 426 to the end-user of mobile terminal 406*b* (for example). For instance, the multimedia data listener unit 430 can filter (i.e., block) any one of the received messages 409 according to various criteria including (for example): (a) the date of message 409; and (b) the size of message 409. The multimedia data editor unit 434 functions to collect a new message 438 from the end-user of the mobile terminal 406*b* (for example). And, the multimedia data uploader unit 436 functions to add an end-user identifier to the collected new message 438 and upload the collected new message 438 to the service platform 402. The multimedia data uploader unit 436 also sends the service platform 402 (in particular the terminal location unit 410) positional information about the mobile terminal 406b (for example) which was obtained by the location function unit 437 (note: the service platform 402 uses this positional information to determine which carousel 416' to update to include the new message 438).

From the foregoing, it can be appreciated by those skilled in the art that the present invention solves the following problems: (1) the storing of user comments that are related to a specific geographical area; and (2) the broadcasting of the relevant information (user comments) that are related to a specific geographical area. In addition, the present invention can be used in a wide variety of applications such as (for example): (1) a tourist application; (2) a cultural application (theater, movies, museum . . . ); (3) a business application (promotions, advertisements . . . ); and (4) a gaming application (treasure hunting, discovering of a site . . . ). A few "use" examples of these applications have been provided below so one can further appreciate the advantages of the present invention.

Tourist application: Bob and Alice visit Paris. Alice arrives in front of a statue of Picasso. She already visited the Picasso museum. And, she would like to write a message to unknown tourists that will be in front of this statue. With her mobile terminal, she opens an application and writes "If you appreciate Picasso, go to the Picasso museum at the following address: . . . ". She clicks on a button to send the message to the set-top box located near the statue. Later, Bob arrives in front of the same statue. He switches on his mobile terminal and initiates an application to check if he can get additional information about this particular statue. Bob receives the comments written by Alice and other tourists about the statue and the museum.

Cultural application (theater, movies, museum, . . . ): At the exist of a museum, John wishes to give his comments about an exposition. With his Personal Digital Assistant (PDA), he launches an application and writes his comment (or records an audio comment). Then, he clicks on the "confirm" button to send the message to the set-top box (or service platform). Later, when Jennifer is at the entry of the museum. She would like to read the comments of the previous visitors to have an idea about the quality of the exposition before she purchases her ticket. With her PDA, she launches an application and clicks on the "listen" button to check and see if an electronic guestbook is available. Then, John's comment and other visitor's comments would be automatically displayed on her PDA.

Business application (promotions, advertisements, . . . ): Holly likes to go shopping. She finds a very cheap item (e.g., shoes) in a shoe store. To give advice to other clients about this item, she writes a message with her mobile terminal about this item and sends the message to the set-top box (or service platform). Later, Caroline arrives in front of the shop. She is able to use her mobile terminal to receive and listen to Holly's message and possibly other messages like for example an advertisement from the store owner. These messages can include text, photos and audio tracks about the shoe store.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A method for enabling end-users of mobile terminals to exchange messages that are associated with a specific geographical location, said method comprising:
   enabling a first end-user of a first mobile terminal to submit a message associated with the specific geographical location and storing the submitted message in a service platform that creates a separate carousel for each set-top box that communicates with the service platform; and
   enabling a second end-user of a second mobile terminal to retrieve the stored message originating from the first mobile terminal when the second mobile terminal is located near the specific geographical location and filtering the stored message at the second mobile terminal to limit its size.

2. The method of claim 1, further comprising determining the second mobile terminal is located near the specific geographical location when communications are initiated between a set-top box and said second mobile terminal where said set-top box is located at the specific geographical location.

3. The method of claim 1, further comprising determining the second mobile terminal is located near the specific geographical location after analyzing a cell identification number located within a signal which was transmitted from the second mobile terminal.

4. The method of claim 1, further comprising determining the second mobile terminal is located near the specific geographical location by utilizing an assisted global positioning system.

5. The method of claim 1, further comprising deleting the stored message from the said service platform if no end-user consults the message, or if the message has been stored for a predetermined time, or if an administrator wants to delete the message.

6. The method of claim 1, wherein said message is a text message, a voice message or a video message that is associated with tourism information, cultural information, shopping information and/or gaming information.

7. The method of claim 1, wherein said specific geographical location is a museum, a shop, a tourist place or a radio network cell.

8. A system, comprising:
   a service platform; and
   a set-top box, wherein:
   said service platform comprises:
      a multimedia data storage manager which builds a separate carousel for the set-top box and for each set-top box, the carousel for the set-top box includes messages received from said set-top box; and
   said set-top box comprises:
      a multimedia data downloader unit which downloads the carousel from said service platform;
      a carousel broadcast unit which broadcasts the messages within the carousel;
      a multimedia data uploader unit which collects a new message and transmits the new message to said service platform; and
      a location unit which determines a geographic location of said set-top box.

9. The system of claim 8, wherein said multimedia data uploader unit further adds an end-user identifier and a location identifier to the collected new message before transmitting the collected new message to said service platform.

10. The system of claim 8, further comprising a mobile terminal which comprises:
a multimedia data listener unit which detects said set-top box, receives the broadcasted messages within the carousel from said set-top box, and filters the received messages to limit their size to enable the received messages to be presented to an end-user; and
a multimedia data editor unit which collects the new message from the end-user and transmits the collected new message to said set-top box.

11. A system, comprising:
a service platform; and
a mobile terminal, wherein said service platform and said mobile terminal communicate with one another via a core network and a radio access network, and wherein:
said service platform comprises:
a multimedia data storage manager which builds a separate carousel of messages for each set-top box in the system, the messages associated with a specific geographical location;
a carousel server which enables a broadcast of the messages within the carousel; and
a location unit which determines a geographic location of said mobile terminal; and
said mobile terminal comprises:
a multimedia data listener unit which detects said service platform and filters the broadcasted messages to limit their size;
a multimedia data downloader unit which receives the broadcasted messages and enables the received messages to be presented to an end-user of said mobile terminal;
a multimedia data editor unit which collects a new message from the end-user; and
a multimedia data uploader unit which transmits the collected new message to said service platform.

12. The system of claim 11, wherein said service platform broadcasts messages which are relevant to the geographic location of said mobile terminal.

13. The system of claim 11, wherein said terminal location unit determines the geographic location of said mobile terminal by analyzing a cell identification number located within a signal which was transmitted from the said mobile terminal.

14. The system of claim 11, wherein said terminal location unit determines the geographic location of said mobile terminal by utilizing an assisted global positioning system.

15. A service platform, comprising:
a multimedia data storage manager which builds a separate carousel of messages for each set-top box communicating with the platform, the messages associated with a specific geographical location;
a location unit which determines a geographic location of a mobile terminal; and
a carousel server which broadcasts the messages within the carousel when said mobile terminal is located near the specific geographical location.

* * * * *